United States Patent [19]

Allard

[11] Patent Number: 5,301,979
[45] Date of Patent: Apr. 12, 1994

[54] PISTON DRIVEN COLD GAS AIR BAG INFLATOR

[75] Inventor: John E. Allard, North Ogden, Utah

[73] Assignee: Morton International, Inc., Chicago, Ill.

[21] Appl. No.: 95,586

[22] Filed: Jul. 23, 1993

[51] Int. Cl.$^5$ .............................................. B60R 21/26
[52] U.S. Cl. ..................... 280.1/737; 280/741; 222/3
[58] Field of Search ...................... 280/736, 737, 741; 102/530, 531; 222/3

[56] References Cited

U.S. PATENT DOCUMENTS 3,868,124  2/1975  Johnson ........................ 102/530 X
5,226,561  7/1993  Hamilton et al. ................ 280/737
5,242,194  4/1993  Popek ............................ 280/737

FOREIGN PATENT DOCUMENTS 0966529  4/1975  Canada ........................... 280/737

Primary Examiner—Margaret A. Focarino
Assistant Examiner—Christopher P. Ellis
Attorney, Agent, or Firm—Gerald K. White

[57] ABSTRACT

Cold pressurized pure inert gas (i.e., argon, nitrogen) is delivered to an air bag with the addition of mechanical energy to aid in filling the bag by an inflator comprising a high strength container or bottle having a cylindrical section that is filled with inert gas. A piston is located at one end of the cylindrical section with a high energy pyrotechnic behind it. Both sides of the piston are at the same pressure during storage. An initiator is located in the high energy pyrotechnic. A burst disk is located at the opposite end of the cylindrical section. When the initiator is fired, the piston is driven down the length of the cylindrical section. When the pressure in the container exceeds the burst disk strength, the inert gas expands into the air bag or apparatus needing to be filled.

8 Claims, 1 Drawing Sheet

PISTON DRIVEN COLD GAS AIR BAG INFLATOR

BACKGROUND OF THE INVENTION

1. Field of the Invention

The present invention relates to an inflator for an inflatable air bag, and more particularly, to an inflator that is operative to fill such an air bag with a pure inert cold gas.

2. Description of the Related Art

An inflatable air bag is a safety device for protecting automotive vehicle occupants in a collision. When the vehicle strikes or is struck by a harm producing object, a sensor detects the change in motion and fires a detonator. This releases gas under high pressure from an inflator into a folded inflatable air bag. The air bag expands and provides a protective cushion that restrains the driver or passenger against various impact conditions.

Many types of inflators have been disclosed in the art for inflating an air bag for use in an inflatable restraint system. One involves the utilization of a quantity of stored compressed inert gas which is selectively released at the stored temperature to inflate the air bag. Another derives a gas source from a combustible gas generating material which, upon ignition, generates a quantity of hot gas sufficient to inflate the air bag. In a third type, the air bag inflating gas results from a combination of stored compressed inert gas and a gas generating material. The last mentioned type, commonly referred to as an augmented gas or hybrid inflator, delivers hot gas to the air bag.

As disclosed in U.S. Pat. No. 3,756,621 granted to Donald J. Lewis, et al. on Sep. 4, 1973, the use of a stored quantity of compressed argon, an inert gas, is advantageous. Compressed air and compressed nitrogen have specific problems related to their use. Air is not inert and when compressed to relatively high pressure becomes a source of significant hazard. Nitrogen is relatively inert when compressed but contributes to the production of nitrogen oxide especially when intermixed with hot gases generated from combustion.

The inflator may comprise a quantity of high pressure inert gas in a storage cylinder or bottle. An advantage accrues, however, where a stored compressed gas augmented by a generated gas is utilized. This advantage involves the addition of energy to the stored compressed gas to aid in filling of the air bag. Current technology with hybrid inflators to obtain this advantage is to heat the stored high pressure gas with some type of pyrotechnic. Such hybrid inflators, however, are subject to a disadvantage, even when argon is used as the stored compressed gas, because the gas delivered to inflate the air bag is hot and is intermixed with a gas produced by combustion of the pyrotechnic. All systems to date fill air bags with some type of gases, particulates or smoke that can be irritating or noxious.

Thus, there is a need and a demand for improvement in inflators to the end of overcoming the foregoing disadvantages. The present invention was devised to fill the gap that has existed in the art in these respects.

SUMMARY OF THE INVENTION

It is an object of the invention to provide an inflator that provides a cold gas which meets the needs of a gas for inflating an air bag without the disadvantages discussed above.

Another object of the invention is to provide an inflator that delivers cold pressurized pure inert gas to an air bag with the addition of purely mechanical energy to aid in filling the air bag.

A further object of the invention is to provide an inflator that is operative to fill an air bag with a cold pure inert gas, cold, that is, relative to the temperature of the gas provided by hot gas inflators and having substantially the same temperature as that stored in the inflator.

In accomplishing these and other objectives of the invention, the energy added to the system to aid in filling the air bag is purely mechanical as opposed to, that is, distinguished from, heat energy delivered by current technology hybrid inflators for that purpose. According to the invention, a high strength cylindrical container or bottle is filled with a pure compressed or pressurized inert gas (i.e., argon, nitrogen). A piston is located at one end of a cylindrical section with a high energy pyrotechnic material behind it. Both sides of the piston are at the same pressure during storage. An initiator that is arranged to be activated by a collision sensitive sensor is located in the high energy pyrotechnic material. A burst disk is located at the opposite end of the cylindrical section. When the initiator is fired, the piston is driven down the length of the cylindrical section. When the pressure in the container exceeds the burst disk strength, the pure inert gas therein expands at the stored temperature thereof into the air bag or other apparatus needing to be filled.

The various features of novelty which characterize the invention are pointed out with particularity in the claims annexed to and forming a part of this specification. For a better understanding of the invention, its operating advantages, and specific objects attained by its use, reference is made to the accompanying drawing and descriptive matter in which a preferred embodiment of the invention is illustrated.

BRIEF DESCRIPTION OF THE DRAWINGS

With this description of the invention, a detailed description follows with reference being made to the accompanying figures of drawing which form part of the specification, and of which.

DESCRIPTION OF THE PREFERRED EMBODIMENT

Figure 1:
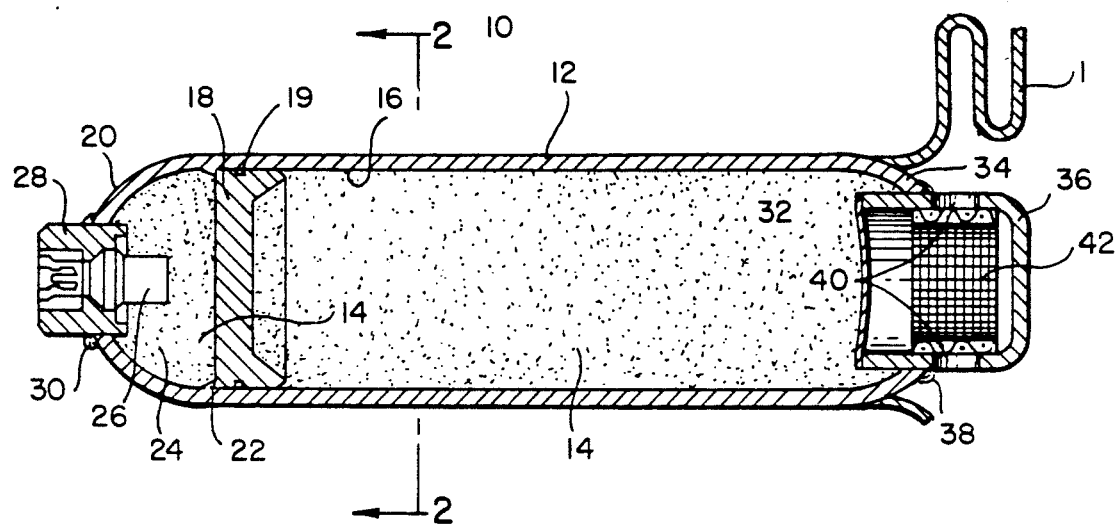
FIG. 1 is a cross sectional side view illustrating the inflator of the present invention.
Figure 2:
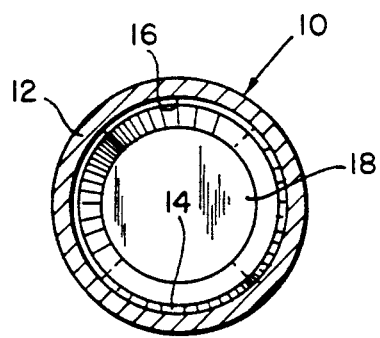
FIG. 2 is a cross sectional view taken along the lines 2—2 of FIG. 1.

Referring to the drawings, there is illustrated an inflator assembly 10 for inflating a vehicle occupant restraint such as an air bag 1. The inflator assembly 10 comprises a high strength container or bottle 12 which defines a chamber 14 that is filled with a pure pressurized inert gas (i.e., argon, nitrogen). Included within the chamber 14 of container 12 is an elongated cylindrical section 16. Chamber 14 is normally sealed so that the pressurized gas stored therein does not escape.

A piston 18 having a piston ring 19 is located in the cylindrical section 16 at a position during storage adjacent a first end 20 of container 12 that is defined by a circular abutment 22. Piston 18 is positioned in a sealed, slidable relation over substantially the full length of the cylindrical section 16.

A high energy pyrotechnic material 24 is located in chamber 12 behind the piston 18, that is, between the piston 18 and the first end 20 of container 12. The pressure of the gas in chamber 14 is the same on both sides of the piston 18 during storage. Suitable fill plug means (not shown) are provided, as known in the art, to effect this result.

An initiator 26 for activating the pyrotechnic 24 is located in the high energy pyrotechnic material 24. The initiator 26, which may comprise a conventional electric squib having a pair of energizing terminals, is positioned in a plug 28 that is located in the first end 20 of the container 12. Plug 28 is sealed in the first end 20 of container 12 by a weld 30.

A burst disk 32 is located at the opposite end of the cylindrical section 16 at a position adjacent a second end 34 of container 12. The burst disk 32 seals a release or outlet conduit 36 that is in communication with an air bag 1 to be inflated. The periphery of the outlet conduit 36 is sealed to the second end 34 of container 12 by a weld 38. Two opposed orifices or outlet ports 40 are provided in the outlet conduit 36. Additional ones of such ports may be provided, if desired.

When the initiator 26 is fired, the piston 18 is moved, that is, driven with a pumping movement down the length of the cylindrical section 16. Such movement of piston 18 increases the pressure of the pure inert cold gas in the chamber 14. When the pressure in the chamber 14 exceeds the strength of the burst disk 32, the pure inert cold gas in the chamber 14 expands through the outlet conduit 36 into the air bag or other apparatus.

The energy added to the inflator assembly 10 by the movement of the piston 18 down the length of the cylindrical section 16 aids in filling the air bag with the cold pure inert gas that had been stored in chamber 11. Such energy is purely mechanical and does not cause admixture with the pure inert gas of other gases or particulates.

None of the gaseous and other materials contained in the space in chamber 14 between the piston 18 and the first end 20 of the inflator assembly 10 is passed by the piston 18 and delivered through the outlet conduit 36 to the air bag 1 during the pumping movement of the piston 18 down the cylindrical section 16.

The outlet ports 40 throttle the flow of the cold pure inert gas, providing the proper fill rate for the air bag. Coarse screen or perforated metal sheet 42 prevents fragments of the burst disk 32 from leaving the inflator 10 and entering the air bag 1.

Thus, in accordance with the invention, there has been provided an inflator assembly that produces pure inert cold gas to fill an air bag. The inflator according to the invention meets the needs of a cold pure inert gas for inflating an air bag without the disadvantages of being heated or made impure or tainted by contact or admixture with other gases, particulates or smoke that can be irritating or noxious.

With this description of the invention in detail, those skilled in the art will appreciate that modifications may be made to the invention without departing from the spirit thereof. Therefore, it is not intended that the scope of the invention be limited to the specific embodiments that have been illustrated and described. Rather, it is intended that the scope of the invention be determined by the scope of the appended claims.

What is claimed is:

1. An inflator for delivering pure inert cold gas to an air bag comprising,
   a container in which a pressurized cold pure inert gas is stored, said container having a first end and a second end, said container including a cylindrical section positioned between said first end and said second end and having an outlet conduit positioned at said second end, said outlet conduit being sealed by a burst disk that ruptures upon a predetermined increase of pressure in said container,
   a piston in sealed, slidable relation over substantially the full length of said cylindrical section of said container, said piston during storage of said cold pure inert gas in said container being positioned at the end of said cylindrical section that is adjacent to the first end of said container,
   pyrotechnic means positioned between said piston and the first end of said container with both sides of said piston being at the same pressure during storage of said pure inert gas in said container, and
   means for activating said pyrotechnic means.

2. An inflator as defined by claim 1 further including a circular abutment located on said cylindrical section of said container at the end thereof adjacent said first end of said container, said circular abutment defining the position of said piston during storage of said cold pure inert gas.

3. An inflator as defined by claim 1 wherein said piston is positioned in sealed slidable relation over substantially the full length of said cylindrical section of said container by a piston ring.

4. An inflator as defined by claim 1 further including a plug located in the first end of said container in a sealed welded relation therewith, and
   wherein said means for activating said pyrotechnic means is positioned in said plug.

5. An inflator as defined by claim 4 wherein said means for activating said pyrotechnic means comprises an initiator.

6. An inflator as defined by claim 1 wherein said outlet conduit includes two opposed outlet ports which throttle the flow of the cold pure inert gas to provide a proper fill rate for the air bag.

7. An inflator as defined by claim 6 further including coarse screen material for preventing fragments of the burst disk from leaving the inflator.

8. An inflator for delivering pure inert cold gas to an air bag comprising,
   a container in which a pressurized cold pure inert gas is stored, said container having a first end and a second end, said container including a cylindrical section positioned between said first end and said second end of said container and having an outlet conduit positioned at said second end, said outlet conduit being sealed by a burst disk that ruptures upon a predetermined increase of pressure in said container,
   a piston in sealed, slidable relation over substantially the full length of said cylindrical section of said container, said piston during storage of said pure inert gas in said container being positioned at the end of said cylindrical section that is adjacent to the first end of said container,
   pyrotechnic material positioned between said piston and the first end of said container with both sides of said piston being at the same pressure during storage of said pure inert gas in said container, and
   initiating means for activating said pyrotechnic material located in said pyrotechnic material,
   whereby, upon activation of said pyrotechnic material by said initiating means, said piston is driven down the length of said cylindrical section to increase the pressure of the pressurized cold pure inert gas in said container, and
   when the pressure in said container exceeds the burst disk strength the burst disk ruptures and allows the pressurized cold pure inert gas in said container to expand through said outlet conduit to an air bag to be inflated.

* * * * *